May 30, 1944.   C. HOLLERITH   2,350,039

REINFORCING FOR BRAKE BLOCKS

Filed June 17, 1943

Inventor

CHARLES HOLLERITH

By Brennan + Langjahr

Attorneys

Patented May 30, 1944

2,350,039

UNITED STATES PATENT OFFICE 2,350,039

REINFORCING FOR BRAKE BLOCKS

Charles Hollerith, Jackson, Mich., assignor to Hayes Industries, Inc., Jackson, Mich., a corporation of Michigan Application June 17, 1943, Serial No. 491,177

6 Claims. (Cl. 188—78)

The present invention relates to brakes and more particularly to a reinforcing construction for hydraulic brakes employing retractor springs engageable with limited portions of the brake blocks.

The present invention constitutes an improvement to the brake block structure disclosed in my copending application Serial No. 275,355, filed May 24, 1939. In that application there is disclosed a brake construction wherein there is a circular rim provided with a plurality of arcuate brake blocks adapted to be assembled upon the periphery of a rim in end-to-end relation and having retractor springs disposed in the ends of the blocks and anchored to the rim. Due to the stresses during operation and high degree of heat generated, it is advisable to strengthen the brake block. The present invention relates to a specific manner of strengthening the brake block. Specifically, the invention consists of recessing adjacent the brake block section and disposing metal tubes in the recesses. The retractor spring for the block extends through the metal tube.

An object of the present invention is to provide a brake construction having a plurality of brake blocks arranged about a rim retracted by a spring extending between adjacent brake blocks and providing a tubular reinforcing through which the retractor spring extends and which is anchored to the ends of the brake block.

Another object of the invention is to provide a brake construction wherein a plurality of brake blocks are arranged end-to-end about a rim and are provided with tubular members extending between adjacent brake blocks and recessed in the ends of adjacent brake blocks together with a retractor spring extending through each tubular member.

Figure 3:
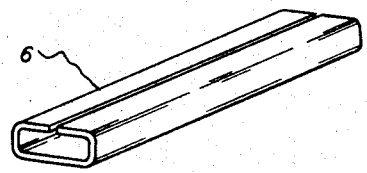
Figure 1:
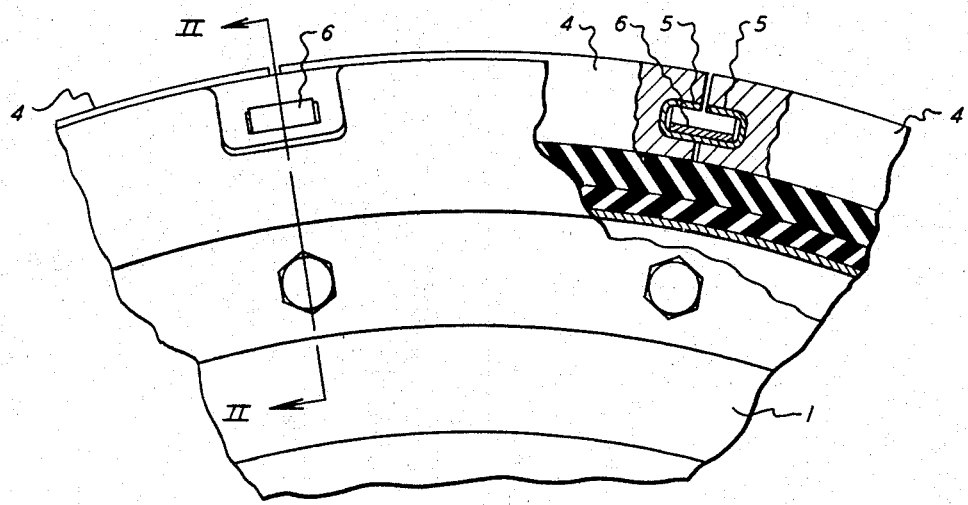
Figure 2:
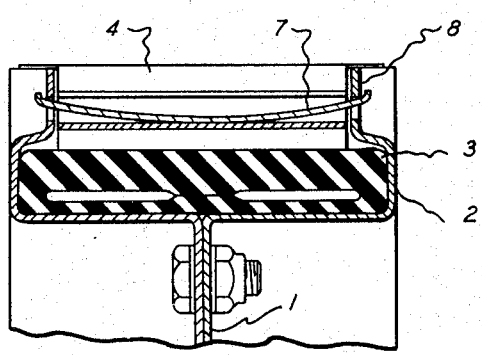

These and other objects residing in the arrangement, combination and construction of the parts will be apparent from the following specification when taken with the accompanying drawing, in which Fig. 1 is a partial side elevation of a rim for supporting an expander tube and brake block assembly, Fig. 2 is a section on the line II—II of Fig. 1, and Fig. 3 is a perspective view of one reinforcing tube according to the present invention.

Referring particularly to the drawing, reference character 1 indicates the web of a rim 2 in which is disposed an annular expander tube 3 expanded by forcing hydraulic fluid thereinto.

Mounted on the rim 2 in position to be forced outwardly by the expander tube 3 are a plurality of arcuate brake blocks 4. Each brake block 4 is adjacent another brake block 4 and in the ends of the brake blocks are disposed transversely extending recesses 5, the recesses 5 preferably being of rectangular cross section. Disposed in each pair of adjacent recesses 5 is a tubular reinforcing member 6 preferably of steel. Reinforcing member 6 is complementary to seats in the recesses 5.

The brake blocks 4 are retracted by leaf springs 7 which extend through the tubular members 6 and have the outer ends thereof anchored in inwardly directed rim portions 8. The particular construction and function of the retractor spring 7 is more particularly disclosed in my aforesaid copending application.

In the operation of the tubular reinforcing member 6, it will be apparent that it serves not only as a reinforcing for the brake block distributing stresses applied thereto by the retractor spring 7, but it also serves to support the brake blocks 4 from one another. The tubular members 6 may preferably be made by rolling and need not have the meeting edges thereof either joined or contacting.

Having thus described my invention, what I desire to secure by Letters Patent and claim is:

1. In a brake construction, a circular rim part, arcuate brake blocks adapted to be assembled upon the periphery of said rim, said brake blocks being positioned adjacent one another end-to-end, metal tubes disposed between adjacent blocks and anchored thereto for supporting said blocks from each other, and means anchoring said blocks to said rim.

2. In a brake construction, a circular rim part, arcuate brake blocks adapted to be assembled and radially acted upon by said rim, said brake blocks being positioned adjacent one another end-to-end, adjacent ends of said brake blocks having transverse recesses therein, and metal tubes disposed between adjacent brake blocks and seated in said recesses, and means anchoring said blocks to said rim.

3. In a brake construction, a circular rim part, arcuate brake blocks adapted to be assembled upon the periphery of said rim, said brake blocks being positioned adjacent one another end-to-end, said brake blocks having transverse recesses in the ends thereof, said recesses being of rectangular cross section, tubular members of rectangular cross section disposed between adjacent blocks and seated in said recesses, and means for anchoring said blocks to said rim.

4. The invention as defined in claim 1 wherein the anchoring means constitutes a tractor spring extending through each tube and anchored to said rim.

5. The invention as defined in claim 2 wherein the anchoring means constitutes a tractor spring extending through each tube and anchored to said rim.

6. The invention as defined in claim 3 wherein the anchoring means constitutes a tractor spring extending through each tubular member and anchored to said rim.

CHARLES HOLLERITH.